(12) United States Patent
Ranka

(10) Patent No.: US 6,242,559 B1
(45) Date of Patent: Jun. 5, 2001

(54) FUNCTIONALIZED HYDROXY FATTY ACID POLYMER SURFACE ACTIVE AGENTS AND METHODS OF MAKING SAME

(75) Inventor: Ajay I. Ranka, Baroda (IN)

(73) Assignee: Zydex Industries, Gujarat (IN)

( * ) Notice: Subject to any disclaimer, the term of this patent is extended or adjusted under 35 U.S.C. 154(b) by 0 days.

(21) Appl. No.: 08/920,798

(22) Filed: Aug. 29, 1997

(51) Int. Cl.[7] .................................................. C08G 63/00
(52) U.S. Cl. .......................... 528/272; 510/109; 510/458
(58) Field of Search .................................. 528/271, 272; 510/108, 276, 119, 129, 109, 458, 513, 515

(56) References Cited

U.S. PATENT DOCUMENTS 3,857,808 * 12/1974 Crozier et al. ..................... 524/879
3,923,723 * 12/1975 Klein ................................... 524/714
5,191,016   3/1993 Yalpani .
5,591,789   1/1997 Iruvanti et al. ..................... 523/515

FOREIGN PATENT DOCUMENTS 0 710 684 A2  5/1996 (EP) .
0 752 439 A1  1/1997 (EP) .
WO 95/34593 12/1995 (WO) .

* cited by examiner

Primary Examiner—Terressa Mosley
(74) Attorney, Agent, or Firm—Alston & Bird LLP

(57) ABSTRACT

The present invention provides methods for the polymerization and functionalization of hydroxy fatty acids to provide surface active agents. The surface active agents can be nonionic, cationic, anionic or amphoteric polymeric surface active agents.

49 Claims, No Drawings

FUNCTIONALIZED HYDROXY FATTY ACID POLYMER SURFACE ACTIVE AGENTS AND METHODS OF MAKING SAME

FIELD OF THE INVENTION

This invention is directed to processes for making polymeric compounds and more particularly to methods for making hydroxy fatty acid polymers and methods of using the same.

BACKGROUND OF THE INVENTION

Surface active agents can be prepared by reacting hydrophobic molecules, such as C10–C22 chain length alcohols, acids or olefins, with various reactants to produce surface active molecules. The resultant compounds can have cationic, anionic, nonionic and amphoteric natures. The compounds find a variety of uses, for example, in textiles, cosmetics, leather treatments, household detergents and other applications. Typically, surface active agents based on cetyl, stearate, oleate, tallow, and behenyl compounds give high levels of lubricity to a given surface.

As the length of the carbon chain increases from C10 to C22, however, the melting points of the compounds increase, and one must increase the strength of hydrophilic group to maintain the desired HLB balance, its ability to be oil or water soluble, or dispersible in oil and water. Further, these products do not provide the same level of the properties provided by silicone-based products at the same percentage of solid concentration. This is particularly true for amino silicones, reactive silicones and elastomeric silicones on a variety of surfaces. These compounds also can have limited long term stability in emulsion formulations.

Most of the surface active agents which show good smoothness and lubricity when applied on textile fibers and fabrics make the surface hydrophobic, i.e, wetting by water is poor. For example, fabric softeners when used in household laundry or mill finishing can make the fabric smooth and silky, but can also lead to poor water uptake, thereby reducing the comfort level of the treated fabrics.

Also, most of these surface active agents which impart smoothness and softness are not water soluble or capable of forming microemulsions on their own. Rather, they form large particle sizes (1–2 microns), which may be a disadvantage at lower levels of application.

SUMMARY OF THE INVENTION

The present invention provides methods for making poly (hydroxy acid) long chain functional molecules having carboxyl and hydroxyl groups. The present invention also provides methods for using the molecules as base materials of various chain lengths which can be reacted with various reactants to form surface active agents which can be cationic, anionic, nonionic or amphoteric in nature.

The present invention of making polymeric surface active molecules overcomes numerous disadvantages of various surface active agents produced by the prior art. For example, the resultant polymers can be branched, and accordingly the melting point of the polymer can drop, despite increasing chain length. Thus the present invention can provide polymeric long chain compounds having improved stabilization, lubricity, solubility, dispersiblility, surface activity, and the like.

The products of the invention can be useful in numerous applications, for example, in textiles, leather, cosmetics, oil industry, detergents, emulsion polymerization and other fields in which conventional emulsifiers are used.

DETAILED DESCRIPTION OF THE INVENTION

The present invention provides methods for producing long chain hydroxy fatty acid based polymers. The resultant long chain hydroxy fatty acid polymers can be reacted with suitable reactants or functionalizing agents to produce a variety of novel surface active agents. The resultant surface active agents can be cationic, anionic, nonionic and/or amphoteric, depending upon the subsequent reaction.

In the invention, at least one long chain hydroxy fatty acid having at least one carboxyl and at least one hydroxyl functionality is polymerized by esterification to make longer chain polyester polymers (referred to herein as poly(hydroxy acid) polymers) having at least one hydroxyl and at least one carboxyl group. Polyesters derived from hydroxy fatty acids can be obtained by heating the hydroxy fatty acid, or a mixture of such acids, optionally in the presence of an esterification catalyst, until the required polyester has been obtained. The esterification preferably is conducted at temperatures ranging from about 120° C. to about 280° C. under reflux conditions for 30 minutes or longer until the desired level of conversion is achieved.

The preferred molecular weight range of the resultant poly(hydroxy acid) is from about 300 to about 3000. The preferred degree of polymerization is from about 1.0 to about 10, more preferably from about 2.0 to about 2.5 and from about 4 to about 4.5, depending upon the specific application of the end product. The degree of polymerization can be controlled by monitoring the acid number value and/or water of esterification of the reaction mixture periodically during esterification. For example, the acid number of the reaction mixture can be periodically measured during esterification so that the reaction can be stopped when the acid number is within the desired range, preferably from about 175 to about 5. For example, the acid value of 12-hydroxy stearic acid is about 170–175, and the acid value of the reaction mixture can be about 5 after polymerization. Water is formed in the esterification reaction and is removed from the reaction mixture, for example, by passing a stream of nitrogen over the reaction mixtures, or by carrying out the reaction in the presence of a solvent such as toluene or xylene and azeotropically removing the water as it is formed.

Acid number is a well known value associated with the acid strength of a substance and is defined as the milligrams (mgs) of KOH required to neutralize the acid in a one gram sample of the product being measured. The higher the amount of acid in the sample, the more KOH needed to neutralize the acid and the higher the acid number.

The resultant polymer or oligomer is then reacted at hydroxyl, carboxyl, or both functionalities, with any of a variety of reactants to impart excellent surface active properties thereto.

A preferred class of long chain hydroxy fatty acids useful in the production of poly(hydroxy acids) in accordance with the invention have the following formula:

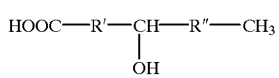

wherein:

each R' and R" is independently selected from $(CH_2)_m$, in which each m is an integer from 1 to 18. Hydroxy fatty acids useful to form the poly(hydroxy acid) compounds preferably contain from 10 to 22 carbon atoms. Exemplary hydroxy fatty acids include, but are not limited to, 5-hydroxy dodecanoic acid, 5-hydroxyhexadeanoic acid, 12-hydroxy stearic acid (12-HSA), and the like. Mixtures of hydroxy fatty acids can also be used.

The polymeric or oligomeric poly(hydroxy acids) can be reacted using standard reactants according to conventional industrial practice to convert a hydroxyl group, or a carboxyl group, or both, on a pendent hydrocarbon chain to produce a variety of cationic, anionic, nonionic and amphoteric surface active agents. For example, the poly(hydroxy acid) can be reacted with amines or polyamines at the carboxyl groups. Such compounds could be further alkylated to make a quaternary amine of poly(hydroxy acid). The preferred type amines are of the following structure:

$$C_nH_mNR^1R^2$$

wherein:

n is an integer from 1 to 10;

m is an integer from 3 to 23;

and each $R^1$ and $R^2$ can be the same or different and is independently selected from hydrogen or C1 to C10 alkyl.

Preferably, the organic amine is a polyfunctional amine, and more preferably a polyalkylene polyamine. Exemplary polyalkylene polyamines include those including at least one reactive —NH or —NH2 group, and having the general formula:

$$R^3R^3N\text{—}[A\text{—}B]_n\text{—}A\text{—}NR^3R^3$$

wherein:

each $R^3$ can be the same or different and is independently selected from hydrogen or C1 to C10 alkyl, which can be unsubstituted or monosubstituted with C1 to C4 alkoxy or cyano group;

n is an integer from 0 to 100;

each A is the same or different and is independently selected from C2 to C4 alkylene or hydroxyalkylene; and B is O, S, or $NR^3$, with $R^3$ having the definition described above.

In a preferred embodiment, the polyalkylene polyamine is a polyalkyleneamine polyamine, e.g., in which B is —$NR^3$— in the foregoing formula.

Suitable polyalkylene polyamines having the foregoing general formula are well known to those skilled in the art. Examples include, but are not limited to, ethylenediamine, diethylenetriamine, triethylenetetramine, propylenediamine, dipropylenetriamine, di-(hydroxypropylene)-triamines, di-(hydroxypropylene)-tertramines, and the like.

In another preferred embodiment of the invention, the poly(hydroxy acid) can be reacted with hydroxyl amines, dihydroxyl amines, and trihydroxyl amines having the following structure, respectively:

1. OH—$R^4$—N—$R^5$
   |
   $R^6$

2. OH—$R^4$—N—$R^5$—OH
   |
   $R^6$

3. OH—$R^4$—N—$R^5$—OH
   |
   $R^6$—OH wherein:

each $R^4$, $R^5$ and $R^6$ is the same or different and is independently selected from hydrogen or C1 to C10 alkyl to form amino functional poly(hydroxy acid).

Alkylating agents which can be employed in converting tertiary amines to quaternary compounds include, but are not limited to, dimethyl sulfate, methyl chloride, ethyl chloride, diethyl sulfate, benzyl chloride, and the like.

The amino functional poly(hydroxy acid) can be, if required, neutralized by a suitable neutralizing agent, such as but not limited to, acetic acid, citric acid, lactic acid, formic acid, tartaric acid, sulfamic acid, oxalic acid, sulfuric acid, hydrochloric acid, nitric acid, phosphoric acid, and the like.

The poly(hydroxy acid) can alternatively be reacted with various sulfonating agents as known in the art, such as but not limited to, concentrated sulfuric acid, oleum, chlorosulfonic acid, sodium-meta-bisulfite, and other sulfonating agents to achieve sulfonic acid end groups which can be neutralized with alkali or organic amine to neutral pH.

Still further, the poly(hydroxy acid) can be reacted with anhydrides, such as but not limited to, maleic anhydride, succinic anhydride, trimellitic anhydride, phthalic anhydride, and the like, to form esters of poly(hydroxy acid). The anhydride will react with pendent hydroxyl groups of poly(hydroxy acid). The resultant pendent carboxyl groups can be neutralized with alkali or amine to impart anionic properties to the polymer.

The poly(hydroxy acid) can also be reacted with ethylene oxide (EO) or propylene oxide (PO) or a combination of both to form various mole lengths of (EO) or (PO) segments. The resultant molecule will have a structure as follows:

Poly(hydroxy acid) $(C_2H_5O)_n(C_2H_5O)_m$ wherein:

n is an integer from 1 to 100; and m is an integer from 0 to 100.

The poly(hydroxy acid) can also be reacted with polyethylene glycols having a molecular weight range of about 200 to about 6000 to provide excellent surface active agents for various applications. One can also react the poly(hydroxy acid) with other polyhydric alcohols, such as but not limited to, glycerol, sorbitol, pentaerythritol and polyglycerol (n=1 to 80) to produce a variety of nonionic polymeric surface active agents.

The poly(hydroxy acid) can also be reacted with various phosphating agents, such as phosphorous pentoxide, phosphoric acid, and the like, to make phosphated poly(hydroxy acid).

The poly(hydroxy acid) can also be reacted as follows with reactants to produce anionic and cationic end groups at the hydroxyl and carboxyl functionalities to provide an amphoteric poly(hydroxy acid) adduct. For example, the poly(hydroxy acid) can be reacted with amino functional reactants as described above resulting in amino functional polymeric fatty alcohols. The polymer fatty alcohols can be further reacted with anhydride as described above to form esters with pendent carboxyl groups, which can be neutralized by alkali or amines. This reaction can produce amphoteric polymeric surface active agents having carboxyl and amino functionalities.

The above mentioned amino functional polymeric fatty alcohols can also be sulfonated by reactants mentioned above to form sulfonic acid end groups which can be further neutralized by alkali or an amine, to give an amphoteric surface active agent having sulfonate and amino functionalities.

The functionalized poly(hydroxy acid) compounds of the invention are useful in a wide variety of applications, such as but not limited to, textile fiber finishing; textile antistatic agents for fibers and filaments during yarn processing; textile fabric finishing; leather finishing; emulsion polymerization; inverse emulsion polymerization; cosmetics and food preparation; mold release agents; detergents; fabric softener in laundry and household washing; oil and mineral industry; pulp and paper industry; plastic processing as additives; and the like.

The following examples are submitted for the purpose of further illustrating the nature of the present invention and should not be interpreted as a limitation on the scope thereof. All parts and percentages in the examples as well as throughout the specification are by weight unless otherwise indicated.

Example I

To a 1 liter flask, equipped with an up and over condenser, agitator, thermometer and heating mantle, was added 800 grams of 12-hydroxy stearic acid, 0.8 grams of Irganox 1010 and 80 grams of xylene. The mixture was heated to reflux conditions around 160 to 190° C., 25 ml of water of esterification was removed continuously and xylene returned back to the reactor. The acid value dropped from 175 to 75. The reactor was cooled down to 140° C. to 160° C. and 150 grams of diethyl ethanol amine was added. The heating was continued under reflux and 24 ml of additional water was removed. The temperature reached 225° C. to 230° C., the acid value reached 3.5 at this stage and water had stopped collecting.

Vacuum was applied to the reaction charge to remove xylene and free unreacted diethyl ethanol amine was distilled over. 77.1 grams of dimethyl sulfate was added to the reactor at 50° C. with cooling and then the reactor was maintained at 70° C. for 2 hours. The product was water dispersible, giving a microemulsion under acidic pH of 5.5.

Example II

To a 1 liter flask, equipped with an up and over condenser agitator, thermometer and heating mantle, was added 800 grams of 12-hydroxy stearic acid and 80 grams of xylene. The mixture was heated to reflux conditions around 160° C. to 180° C., 38 ml water of esterification was removed continuously and xylene returned back to the reactor. The acid value dropped to 40 from 175. The reactor was cooled down to 140° C. to 160° C. and 120 grams of diethylene triamine was added. The heating was continued under reflux and 14 ml additional water was removed. The acid value had reached 3.5 at this stage and water had stopped collecting. The vacuum was applied to the reaction charge. Xylene and free unreacted diethylene triamine were distilled over. 77.1 grams of dimethyl sulphate was added to the reactor at 50° C. with cooling and the reactor was maintained at 70° C. for 2 hours. The product was water dispersible under acidic pH of 5.5.

Example III

To a 10 liter flask, equipped with an up and over condenser, agitator, thermometer and heating mantle, was added 8000 grams of 12-HSA and 400 grams of xylene. The mixture was heated to reflux conditions between 160° C. to 180° C., 350 ml water was removed and esterification was stopped. The final product was liquid at room temperature with acid value of 50. The expected average molecular weight is approximately 1100 .

The resultant product was charged in to a pressure reactor and 16 grams of 50% NaOH was added and 12000 parts of ethylene oxide was charged and reacted at 160° C. for 2 hours. The pressure was released and the product vacuum stripped. The resultant product was 38–42 moles E.O. attached to poly(12-HSA). The product was water soluble.

Example IV

To a 1 liter flask, equipped with an up and over condenser, agitator, thermometer and heating mantle, was added 800 grams of 12-HSA and 80 grams of xylene. The mixture was heated to reflux conditions around 160° C. to 180° C., 25 ml of water of esterification was removed continuously and xylene returned back to the reactor. The acid value came down to 75. The reactor was cooled down to 60° C. and 125 grams of concentrated 98% sulfuric acid was added slowly under agitation and reaction was held at 75° C. for 1 hour and the product vacuum distilled. The resulting product was sulfonated poly(12-HSA).

Example V

All cotton, all polyester and polyester-cellulosic blend fabrics which have already had sizing agents removed, scoured, bleached and dyed, were finished with 0.2% of the solution made from the product prepared from Example I above and dried on a stenter. The solution prepared was translucent and the finished textiles showed equal hand rating for smoothness and softness replacing equal weight of 0.2% pure amino silicone oil microemulsified with the help of 0.1% emulsifier. The fabric treated with the resultant polymer was more hydrophilic compared to one treated with amino silicone.

Example VI

After preliminary operations chrome tanned cow leather was given a top fat liquor treatment at 55° to 60° C. for about 1 hour with the product prepared from Example I. A stearate acid based commercially available under the designation Lipamine FB50 from BASF India Ltd. top fat liquor was used for comparison. The concentration selected based on the weight of leather was 0.33% for the product prepared as described in Example I and 1% for the commercially available stearic acid based product. The treated samples were dried under stretched conditions.

The leather sample finished with the product prepared from Example I was superior in surface smoothness with improved tightness and nourishment as compared to that finished with the commercially available stearic acid based product.

Example VII

Polyester and nylon fabrics were treated with 0.3% of the polymer prepared as described in Example I above, and comparative samples were prepared using a commercially available antistatic agent available under the designation LB40 from Henkel India Ltd. The fabrics were charged using special charging rods. Electrostatic charge build up and its decay was studied using an electrometer. Polymer from Example I showed better antistatic properties as compared to the commercial sample.

The foregoing examples are illustrative of the present invention and are not to be construed as limiting thereof.

That which is claimed is:

1. A method of making functionalized hydroxy fatty acid polymer surface active agents, comprising:
   polymerizing at least one hydroxy fatty acid to produce a hydroxy fatty acid polymer having at least one pendent hydroxy group and at least one pendent carboxyl group; and
   reacting at least one of said hydroxy group or said carboxyl group with a functionalizing agent to form a surface active functionalized hydroxy fatty acid polymer.

2. The method of claim 1, wherein said polymerization step comprises heating said at least one hydroxy fatty acid at a temperature from about 120° C. to about 280° C. to polymerize said fatty acid by esterification.

3. The method of claim 1, wherein said polymerization step comprises polymerizing said at least one hydroxy fatty acid to produce a hydroxy fatty acid polymer having a molecular weight from about 300 to about 3000, said molecular weight calculated as a stoichiometric ratio of a quantity of water of esterification removed during said polymerization step.

4. The method of claim 1, wherein said at least one hydroxy fatty acid has the formula:

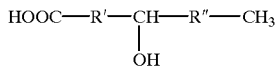

wherein:
   each R' and R" is independently selected from $(CH_2)_m$, in which each m is an integer from 1 to 18.

5. The method of claim 1, wherein said at least one hydroxy fatty acid is 12-hydroxy stearic acid.

6. The method of claim 1, wherein said functionalizing agent is selected from the group consisting of amines, sulfonating agents, phosphating agents, anhydrides, alkylene oxides, and polyhydric alcohols.

7. The method of claim 6, wherein said amine is selected from the group consisting of primary amines, secondary amines, tertiary amines, polyfunctional amines, and hydroxy-substituted amines.

8. The method of claim 7, further comprising alkylating said functionalized polymer to form a quaternary compound.

9. The method of claim 8, wherein said alkylating agent is selected from the group consisting of dimethyl sulphate, diethyl sulphate, methyl chloride, ethyl chloride and benzyl chloride.

10. The method of claim 6, wherein said sulfonating agents are selected from the group consisting of sulfuric acid, oleum, chloro sulfonic acid and sodium meta bisulfite.

11. The method of claim 6, wherein said phosphating agents are selected from the group consisting of phosphoric acid and phosphorous pentoxide.

12. The method of claim 6, wherein said anhydrides are selected from the group consisting of maleic anhydride, succinic anhydride, trimellitic anhydride and phthalic anhydride.

13. The method of claim 6, wherein said alkylene oxides are selected from the group consisting of ethylene oxide, propylene oxide and mixtures thereof.

14. The method of claim 13, wherein 1 to 100 moles ethylene oxide and 0 to 100 moles propylene oxide are reacted.

15. The method of claim 6, wherein said polyhydric alcohols are selected from the group consisting of polyethylene glycol, glycerol, polyglycerol, sorbitol, and pentaerythritol.

16. A functionalized hydroxy fatty acid polymer surface active agent comprising an esterification reaction product of at least one hydroxy fatty acid, said esterification product having a molecular weight from about 300 to about 3000 and a degree of polymerization of less than 10, said molecular weight calculated as a stoichiometric ratio 0f a quantity of water of esterification removed during esterification, and further comprising at least one pendant carboxy group and at least one pendent hydroxy group, at least one of which is reacted with at least one functionalizing agent.

17. The polymer of claim 16, wherein said carboxyl group is reacted with a functionalizing agent.

18. The polymer of claim 16, wherein said hydroxyl group is reacted with a functionalizing agent.

19. The polymer of claim 16, wherein both of said carboxyl and hydroxyl groups are reacted with functionalizing agents.

20. The polymer of claim 16, wherein said at least one hydroxy fatty acid has the formula:

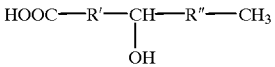

wherein:
   each R' and R" is independently selected from $(CH_2)_m$, in which each m is an integer from 1 to 18.

21. The polymer of claim 16, wherein said at least one hydroxy fatty acid is 12-hydroxy stearic acid.

22. The polymer of claim 16, wherein said functionalizing agent is selected from the group consisting of amines, sulfonating agents, phosphating agents, anhydrides, alkylene oxides, and polyhydric alcohols.

23. A surface active agent comprising a functionalized hydroxy fatty acid polymer prepared according to the process of:
   polymerizing at least one hydroxy fatty acid to produce a hydroxy fatty acid polymer having at least one pendent hydroxy group and at least one pendent carboxyl group, said polymer having a degree of polymerization of less than 10; and
   reacting at least one of said hydroxy group or said carboxyl group with a functionalizing agent to form a functionalized hydroxy fatty acid polymer surface active agent.

24. An emulsion comprising an emulsifier comprising a functionalized hydroxy fatty acid polymer surface active agent prepared according to the process of:
   polymerizing at least one hydroxy fatty acid to produce a hydroxy fatty acid polymer having at least one pendent hydroxy group and at least one pendent carboxyl group; and
   reacting at least one of said hydroxy group or said carboxyl group with a functionalizing agent to form a functionalized hydroxy fatty acid polymer surface active agent.

25. A method of treating an article to impart desired properties thereto, comprising applying to said article a surface active agent comprising an esterification reaction product of at least one hydroxy fatty acid, said esterification product having a molecular weight from about 300 to about 3000, said molecular weight calculated as a stoichiometric ratio of a quantity of water of esterification removed during esterification, and further comprising at least one pendent carboxy group and at least one pendent hydroxy group, at least one of which is reacted with at least one functionalizing agent.

26. The method of claim 25, wherein said article is selected from the group consisting of textile articles and leather articles.

reacting at least one of said hydroxy group or said carboxyl group with a functionalizing agent to form a functionalized hydroxy fatty acid polymer surface active agent.

27. The method of claim 1, wherein said hydroxy fatty acid polymer has a degree of polymerization of less than 10.

28. The method of claim 1, wherein said hydroxy fatty acid polymer has a degree of polymerization from about 1 to about 4.5.

29. The polymer of claim 16, wherein said esterification product has a degree of polymerization from about 1 to about 4.5.

30. The surface active agent of claim 23, wherein said polymer has a degree of polymerization from about 1 to about 4.5.

31. The emulsion of claim 24, wherein said polymer has a degree of polymerization of less than 10.

32. The emulsion of claim 24, wherein said polymer has a degree of polymerization from about 1 to about 4.5.

33. The method of claim 25, wherein said product has a degree of polymerization of less than 10.

34. The method of claim 25, wherein said product has a degree of polymerization from about 1 to about 4.5.

35. A method of making functionalized 12-hydroxy stearic acid polymer surface active agents, comprising:

polymerizing 12-hydroxy stearic acid to produce 12-hydroxy stearic acid polymer having at least one pendent hydroxy group and at least one pendent carboxyl group; and reacting at least one of said hydroxy group or said carboxyl group with a functionalizing agent to form a functionalized 12-hydroxy stearic acid polymer surface active agent.

36. The method of claim 35, wherein said polymerizing step comprises polymerizing 12-hydroxy stearic acid to produce 12-hydroxy stearic acid polymer having a degree of polymerization of less than 10.

37. The method of claim 35, wherein said polymerizing step comprises polymerizing 12-hydroxy stearic acid to produce 12-hydroxy stearic acid polymer having a degree of polymerization from about 1 to about 4.5.

38. A functionalized 12-hydroxy stearic acid polymer surface active agent comprising an esterification reaction product of 12-hydroxy stearic acid, said esterification product having a molecular weight from about 300 to about 3000, said molecular weight calculated as a stoichiometric ratio of a quantity of water of esterification removed during esterification, and further comprising at least one pendent carboxy group and at least one pendent hydroxy group, at least one of which is reacted with at least one functionalizing agent.

39. The surface active agent of claim 38, wherein said esterification product has a degree of polymerization of less than 10.

40. The surface active agent of claim 38, wherein said esterification product has a degree of polymerization from about 1 to about 4.5.

41. A surface active agent comprising a functionalized 12-hydroxy stearic acid polymer prepared according to the process of:

polymerizing 12-hydroxy stearic acid to produce a 12-hydroxy stearic acid polymer having at least one pendent hydroxy group and at least one pendent carboxyl group; and reacting at least one of said hydroxy group or said carboxyl group with a functionalizing agent to form a functionalized 12-hydroxy stearic acid polymer surface active agent.

42. The surface active agent of claim 41, wherein said polymer has a degree of polymerization of less than 10.

43. The surface active agent of claim 41, wherein said polymer has a degree of polymerization from about 1 to about 4.5.

44. An emulsion comprising an emulsifier comprising a functionalized 12-hydroxy stearic acid polymer surface active agent prepared according to the process of:

polymerizing 12-hydroxy stearic acid to produce 12-hydroxy stearic acid polymer having at least one pendent hydroxy group and at least one pendent carboxyl group; and reacting at least one of said hydroxy group or said carboxyl group with a functionalizing agent to form a functionalized 12-hydroxy stearic acid polymer surface active agent.

45. The emulsion of claim 44, wherein said 12-hydroxy stearic acid polymer has a degree of polymerization of less than 10.

46. The emulsion of claim 44, wherein said 12-hydroxy stearic acid polymer has a degree of polymerization from about 1 to about 4.5.

47. A method of treating an article to impart desired properties thereto, comprising applying to said article a 12-hydroxy stearic acid polymer surface active agent comprising an esterification reaction product of 12-hydroxy stearic acid, said esterification product having a molecular weight from about 300 to about 3000, said molecular weight calculated as a stoichiometric ratio of a quantity of water of esterification removed during esterification, and further comprising at least one pendent carboxy group and at least one pendent hydroxy group, at least one of which is reacted with at least one functionalizing agent.

48. The method of claim 47, wherein said 12-hydroxy stearic acid polymer surface active agent has a degree of polymerization of less than 10.

49. The method of claim 47, wherein said 12-hydroxy stearic acid polymer surface active agent has a degree of polymerization from about 1 to about 4.5.

* * * * *

UNITED STATES PATENT AND TRADEMARK OFFICE
CERTIFICATE OF CORRECTION

PATENT NO. : 6,242,559 B1
DATED : June 5, 2001
INVENTOR(S) : Ranka

Page 1 of 1

It is certified that error appears in the above-identified patent and that said Letters Patent is hereby corrected as shown below:

<u>Column 8,</u>
Line 6, "Of" should read -- of --;
Line 8, "pendant" should read -- pendent --.

<u>Column 9,</u>
Lines 4-7, delete "reacting at least one of said hydroxy group or said carboxyl group with a functionalizing agent to form a functionalized hydroxy fatty acid polymer surface active agent."

Signed and Sealed this

Fifth Day of February, 2002

*Attest:*

JAMES E. ROGAN
*Director of the United States Patent and Trademark Office*

*Attesting Officer*